United States Patent [19]

Sandhage

[11] Patent Number: 5,447,291
[45] Date of Patent: Sep. 5, 1995

[54] PROCESSES FOR FABRICATING STRUCTURAL CERAMIC BODIES AND STRUCTURAL CERAMIC-BEARING COMPOSITE BODIES

[75] Inventor: Kenneth H. Sandhage, Columbus, Ohio

[73] Assignee: The Ohio State University, Columbus, Ohio

[21] Appl. No.: 134,321

[22] Filed: Oct. 8, 1993

[51] Int. Cl.$^6$ .......................... C04B 35/00; B22F 7/00
[52] U.S. Cl. ........................ 264/60; 264/65; 264/66; 148/284; 148/285; 148/286; 427/372.2; 427/376.3; 427/383.5; 156/89
[58] Field of Search ............... 501/117, 118, 121, 122, 501/125; 148/277, 284, 285, 286; 427/383.5, 372.2, 376.3; 264/60, 65, 66

[56] References Cited

U.S. PATENT DOCUMENTS

| | | | |
|---|---|---|---|
| 2,167,701 | 8/1939 | Whitfield et al. | 148/285 |
| 3,255,027 | 6/1966 | Talsma | 264/65 |
| 3,473,938 | 10/1969 | Oberlin | 264/65 |
| 3,473,987 | 10/1969 | Sowards | 264/65 |
| 3,730,783 | 5/1973 | Streel | 148/285 |
| 3,907,611 | 9/1975 | Sasame et al. | 148/285 X |
| 4,102,678 | 7/1978 | Gothard et al. | 427/357 X |
| 4,364,780 | 12/1982 | Blanken | 148/285 X |
| 4,452,674 | 6/1984 | Gillich et al. | 205/320 X |
| 4,480,677 | 11/1984 | Henson et al. | 164/46 |
| 4,557,770 | 12/1985 | Vidoz et al. | 148/415 |
| 4,627,959 | 12/1986 | Gilman et al. | 264/122 X |
| 4,645,117 | 2/1987 | Knapp et al. | 228/124.1 |
| 4,713,360 | 12/1987 | Newkirk . | |
| 4,735,771 | 4/1988 | Corwin | 420/129 |
| 4,761,266 | 8/1988 | Bruski | 75/408 X |
| 4,808,558 | 2/1989 | Park et al. | 501/88 X |
| 4,850,422 | 7/1989 | Compton et al. | 164/473 |
| 4,871,696 | 10/1989 | Newkirk et al. | 501/94 |
| 4,946,806 | 8/1990 | Willard | 501/117 X |
| 5,120,352 | 6/1992 | Jackson et al. | 75/346 |
| 5,120,580 | 6/1992 | Lesher et al. | 427/383.5 |
| 5,214,011 | 5/1993 | Breslin . | |

FOREIGN PATENT DOCUMENTS 3150343 6/1991 Japan .................................. 148/285

OTHER PUBLICATIONS

G. J. Yurek et al., "Direct Synthesis of a Metal/Superconducting Oxide Composite by Oxidation of a Metallic Precursor", *J. Electrochem. Soc.*, vol. 134, 1987, pp. 2635–2636.

Z. A. Munir, "Synthesis of High Temperture Materials of Self-Propagating Combustion Methods", *Amer. Cer. Soc. Bull.*, vol. 67, No. 2, 1988, pp. 342–349.

M. S. Newkirk et al., "Preparation of Lanixide TM Ceramic Matrix Composites: Matrix Formation by the Directed Oxidation of Molten Metals", *Ceram. Eng. Sci. Proc.*, vol. 8, No. 7–8, 1987, pp. 879–882.

J. D. Cawley, "Joining of Ceramic-Matrix Composites", *Amer. Cer. Soc. Bull.*, vol. 68, No. 9, 1989, pp. 1619–1623.

A. S. Nagelberg et al., "Formation of $Al_2O_3$/Metal Composites by the Directed Oxidation of Molten Aluminum–Magnesium–Silicon Alloys: Part II, Growth Kinetics", *J. Am. Ceram. Soc.*, vol. 75, No. 2, 1992, pp. 455–462.

S. Antolin et al., "Formation of $Al_2O_3$/Metal Composites by the Direction Oxidation of Molten Aluminum–Magnesium–Silicon Alloys: Part I, Mictrostructural Development", *J. Am. Ceram. Soc.*, vol. 75, No. 2, 1992, pp. 447–454.

*Primary Examiner*—David A. Simmons
*Assistant Examiner*—M. Curtis Mayes
*Attorney, Agent, or Firm*—Frank H. Foster

[57] ABSTRACT

Shaped refractory ceramic and refractory ceramic composite objects are made from corresponding shaped, oxidation-resistant-metal-bearing objects through exposure to an oxidizing environment without substantial changes in dimensions by providing in the shaped metal-bearing objects a combination of a) metals which when oxidized form a ceramic compound with a larger molar volume than the molar volume of the metals consumed to make the ceramic compound with b) metals which when oxidized form a ceramic compound with a smaller molar volume than the molar volume of (Abstract continued on next page.)

the metals consumed to make the ceramic compound. Metal-bearing objects, containing metals such as silicon or aluminum, which when oxidized form ceramic or ceramic-composite objects containing refractory ceramic compounds of desired properties, such as compounds containing silicon oxide or aluminum oxide, for which the ceramic compounds have a molar volume that is greater than the molar volumes of the metals consumed to make the ceramic compounds, expand upon oxidation, thereby having an adverse effect on the properties of the resulting ceramic and preventing the maintenance of the dimensions of the metal-bearing objects. The present invention is the discovery that when alkali or alkaline earth metals, which when oxidized have molar volumes that are less than such metals, are alloyed with or otherwise combined with oxidation-resistant metals that are formed into the metal-bearing objects and converted into desired refractory ceramics, swelling, resulting loss of mechanical properties, and dimensional changes are reduced or eliminated. Further, such combination of a) metals that after oxidation form ceramic compounds having a molar volume greater than the molar volumes of the metals consumed to make the ceramic compound with b) alkali or alkaline earth metals that after oxidation form ceramic compounds having a molar volume less than the molar volume of the alkali or alkaline earth metals consumed to make the ceramic compounds provides an unexpectedly advantageous brazing alloy for joining ceramic-bearing bodies.

31 Claims, No Drawings

PROCESSES FOR FABRICATING STRUCTURAL CERAMIC BODIES AND STRUCTURAL CERAMIC-BEARING COMPOSITE BODIES

TECHNICAL FIELD

This invention relates to novel solid metal-bearing precursors to refractory structural ceramics and refractory structural ceramic composites, and to oxidation processes that permit the fabrication of refractory structural ceramics and refractory structural ceramic composites at modest temperatures and in geometries and constructions not easily achieved with conventional ceramic processes.

Definitions of Terms

This application describes new solid metal-bearing precursors to, and new oxidation approaches for synthesizing, refractory structural ceramics and refractory structural ceramic composites. "Oxidation" is the process by which metal elements are converted to a higher valence state. The term "alloy" for the purposes of this specification and the claims shall mean any combination of elements including but not limited to a solid solution, an inclusion of one or more metal phases in the matrix of another, an intermetallic compound included in or constituting the alloy, mechanically-produced alloys, and particulates of one or more metal mixed with the particulates of another. For the purposes of this specification, the alkaline earth metals are magnesium, calcium, strontium, barium, and radium. The element beryllium, which is normally considered an alkaline earth metal, is not considered an alkaline earth metal in this specification because beryllium oxide has a molar volume that is larger than the molar volume of beryllium. Metals or metallic alloys can be oxidized by heating in an oxidizing gaseous atmosphere (for example, in atmospheres containing oxygen, nitrogen, sulfur, phosphorus, carbon, hydrogen, chlorine, fluorine, bromine, or iodine in the form of $O_2(g)$, $N_2(g)$, $S_2(g)$, $SO(g)$, $SO_2(g)$, $SO_3(g)$, $CO(g)$, $CO_2(g)$, $N_2O(g)$, $NO(g)$, $NO_2(g)$, $N_2O_3(g)$, $N_2O_4(g)$, $N_2O_5(g)$, $NH(g)$, $NH_2(g)$, $NH_3(g)$, $N_2H_2(g)$, $N_2H_4(g)$, $Cl_2(g)$, $HCl(g)$, $SCl(g)$, $SCl_2(g)$, $S_2Cl(g)$, $S_2Cl_2(g)$, $CCl(g)$, $CCl_2(g)$, $CCl_3(g)$, $CCl_4(g)$, $C_2Cl_2(g)$, $C_2Cl_4(g)$, $C_2Cl_6(g)$, $F_2(g)$, $HF(g)$, $NF(g)$, $NF_2(g)$, $NF_3(g)$, $N_2F_2(g)$, $N_2F_4(g)$, $SF(g)$, $SF_2(g)$, $SF_3(g)$, $SF_4(g)$, $SF_5(g)$, $SF_6(g)$, $CF(g)$, $CF_2(g)$, $CF_3(g)$, $CF_4(g)$, $C_2F_2(g)$, $C_2F_4(g)$, $C_2F_6(g)$, $ClF(g)$, $ClF_3(g)$, $ClF_5(g)$, $H_2(g)$, $HCl(g)$, $CH(g)$, $CH_2(g)$, $CH_3(g)$, $CH_4(g)$, $C_2H_2(g)$, $C_2H_4(g)$, $C_2H_6(g)$, and $C_6H_6(g)$) or by heating with exposure to liquid or solid oxidants (for example, in liquids or solids containing oxygen, nitrogen, sulfur, phosphorus, carbon, hydrogen, chlorine, fluorine, bromine, or iodine). Metals or metallic alloys can also be oxidized by applying an electric potential. "Combustive oxidation" or "combustion" refers to nonisothermal oxidation during which the required heat for oxidation is provided by a highly exothermic, self-sustaining reaction that occurs along a wave front that rapidly propagates through an ignited body. The term "oxidation-resistant metal" refers to a metal or alloy that forms a dense, adherent, slow-growing oxide scale on its surface which severely retards the rate of oxidation. For the purposes of this specification, oxidation-resistant metals are those metal elements that form dense, adherent oxide scales that either a) thicken at a slower rate below 600° C. in pure oxygen than the oxide scale(s) formed during the oxidation of metallic titanium, or b) that thicken at a slower rate above 600° C. in pure oxygen than the oxide scale(s) formed during the oxidation of metallic copper. Such oxidation-resistant metals include, but are not limited to, aluminum, silicon, and chromium.

A "ceramic" is defined herein as a compound in which a metal species has been placed in a higher valence state. A metal oxide is a common example of a ceramic. While metal oxides contain oxygen, it should be noted that "ceramics," as defined herein, do not necessarily contain oxygen. Examples of non-oxide ceramics include sulfides, halides, carbides, nitrides, oxycarbides, and oxynitrides. A "ceramic composite" refers to a mixture of phases, one or more of which consist of a ceramic. Examples of ceramic composites include mixtures of ceramic+metal phases, ceramic+ceramic phases, or ceramic+polymer phases. The terms "structural ceramic" or "structural ceramic composite" refer to ceramics or ceramic composites, respectively, that are used primarily for their desired mechanical properties. Examples of such mechanical properties include strength, toughness, Young's modulus, hardness, stiffness, fatigue resistance, creep resistance, and wear resistance. The desired mechanical performance of a structural ceramic or structural ceramic composite may apply at room temperature or at elevated temperatures, and/or at 1 atm pressure or at elevated pressures, and/or in corrosive environments (e.g., exposure to corrosive gases or liquids or to erosive solid particles). A "refractory" body refers herein to a body that does not melt or otherwise decompose at temperatures in excess of 700° C. in environments containing corrosive, erosive, abrasive, or inert gases, liquids, or solids. A "refractory structural ceramic" and a "refractory structural ceramic composite" are defined herein as a structural ceramic and structural ceramic composite, respectively, that retain desired mechanical performance at temperatures in excess of 700° C., and/or at pressures in excess of 1 atm, and/or in environments containing corrosive, erosive, or abrasive gases, liquids, or solids.

Background Art

Structural ceramics and structural ceramic composites have a wide variety of current and potential applications. For example, the requirements of stiffness, toughness, light weight, high-temperature strength, and high-temperature creep resistance make refractory ceramic-matrix composites attractive for advanced, high-temperature engine components in the aerospace, trucking, and electric utility industries. Ceramic-bearing, metal-matrix composites are also desired for a variety of lower temperature structural applications (e.g., for components in automobiles). Despite the great potential for ceramic-bearing composites, however, significant problems have been encountered during processing.

For example, a conventional method for preparing fiber-reinforced, ceramic-matrix composites is the slurry infiltration method. A fiber preform (a "tow") is infiltrated by passing the preform through a slurry containing organic material (binder, solvent, dispersing agent, wetting agent, etc.) and powder of the matrix phase. Coated preforms are dried, cut, and stacked in a desired configuration. The organic material is then burned away and the resulting porous composite is densified by firing at an elevated temperature. Unfortunately, relatively high firing temperatures are usually required to completely densify refractory matrices prepared in this manner. Such high temperatures can result in degradation of the mechanical toughness of the composite due to fiber-matrix reactions or to fiber oxidation (i.e., if the fibers are composed of metals or non-oxide ceramics). Liquid-phase sintering aids can be used to enhance the densification rate at relatively low firing temperatures, but at the cost of reducing the high-temperature creep resistance of the composite. While hot pressing could be used to enhance the densification rate, it cannot be used to produce components with a variety of complex shapes. Glass-ceramic matrix materials can be sintered to high densities by firing at a temperature above the softening point of the glass (i.e., by viscous flow sintering). However, glass-ceramic materials with modest softening temperatures tend to exhibit poor high-temperature creep resistance. Other methods that have been used to produce refractory ceramic-matrix composites tend to be relatively expensive (e.g., chemical vapor deposition or infiltration), involve significant shrinkage during firing (e.g., sol-gel or polymer precursor routes), or result in significant fiber-matrix reactions (infiltration of fibers with a high-temperature oxide melt). Alternate processing methods are needed to produce dense, complex-shape, refractory structural ceramic components at modest temperatures and with a minimum number of processing steps.

A number of oxidation processes have been developed for preparing structural ceramics and structural ceramic composites. One such method, referred to as "self-propagating high temperature synthesis (SHS)," involves the ignition of a highly exothermic reaction (or reactions) that generates a self-propagating combustion wave (or waves) that rapidly migrates through a precursor. This process has been used to produce a variety of refractory ceramic compounds, including nitrides, carbides, borides, hydrides, and silicides, as well as ceramic composites containing these compounds. Z. A. Munir, "Synthesis of High Temperature Materials by Self-Propagating Combustion Methods," *Amer. Cer. Soc. Bull.*, Vol. 67, 1988, pp. 342-349; Because the heat for combustion is provided by the oxidation reaction itself, refractory ceramic compounds can be produced with significant energy savings compared to other processing schemes. Unfortunately, the bodies produced by the SHS method tend to be relatively porous (typically on the order of 50% porosity). Relatively high densities can be obtained during combustion synthesis by placing the precursor at an elevated uniaxial pressure (i.e., simultaneous combustion synthesis and hot pressing). Unfortunately, the use of elevated pressures makes the fabrication of complex-shape structural ceramic components more difficult. Further, owing to the relatively high temperatures generated at the combustion front (usually well in excess of 1500° C.) and the steep temperature gradients generated within the precursor, undesired defects (e.g., cracks, pores, undesired chemical reactions) can be produced in the resulting ceramic or ceramic composite.

Recently, two alternate processes that also involve oxidation reactions have been developed for producing relatively dense structural composites of ceramic and metal. With these methods, a molten metallic precursor is reacted with an oxidant to form a ceramic-metal composite. Oxidation occurs at a relatively rapid rate in both methods (although, in a non-combustive manner) because fresh molten metal is continuously drawn through the oxidation reaction product, which allows new oxidation product to continue to form at the interface between the oxidant and the previously formed oxidation product. In the DIMOX (directed metal oxidation) process, a ceramic-metal composite (known as a Lanxide TM ceramic composite) is produced by the reaction of a gas-phase oxidant with a molten metal. For example, an $Al/Al_2O_3$ composite has been fabricated by reacting a molten Mg—Si-bearing aluminum alloy with gaseous oxygen. M. S. Newkirk, H. D. Lesher, D. R. White, C. R. Kennedy, A W Urquhart, T. D. Claar, "Preparation of Lanxide Ceramic Matrix Composites: Matrix Formation by the Directed Oxidation of Molten Metals, *Ceram Eng Sci. Proc.*, Vol. 8, No. 7-8, 1987, pp. 879-82. A ceramic-metal composite can also be produced by the reaction of a condensed phase oxidant with a molten metal; the resulting composite is referred to as $C^4$ (co-continuous ceramic composite). For example, an $Al/Al_2O_3$ composite has also been prepared by an oxidation-reduction reaction between molten aluminum (the reductant) and solid silica (the oxidant). U.S. Pat. No. 5,214,011 "Process for Preparing Ceramic-Metal Composite Bodies," by M. C. Breslin.

In the case of the DIMOX process, the molten metal precursor is contained in an inert crucible (e.g., graphite or alumina) during oxidation. Because the reaction product grows outward from the surface of the molten metal that is exposed to the gas-phase oxidant, the resulting ceramic-metal composite tends to retain the shape of the crucible. Hence, in the DIMOX process, the formation of complex-shape ceramic-metal composite requires the use of a complex shape crucible. For the synthesis of $C^4$, a condensed-phase oxidant (e.g., solid silica) is consumed by reaction with the molten metal so that the reaction product grows into the oxidant. Consequently, $C^4$ tends to retain the original shape of the ceramic oxidant, which means that a complex-shape oxidant must be used to produce a complex-shape composite. Hence, the syntheses of complex-shape Lanxide TM and $C^4$ ceramic-metal composites both require the fabrication of complex-shape ceramics. Further, because the syntheses of thick Lanxide TM and $C^4$ composites rely upon the infiltration of molten metal through the oxidation product, these processes are not well-suited for producing refractory structural ceramic composites that are completely free of metal phases (e.g., ceramic fiber-reinforced, ceramic-matrix composites).

Yet another oxidation method for producing a ceramic or ceramic composite is to oxidize a solid metallic precursor. With this approach, a dense, shaped solid metallic body is oxidized to form a ceramic composite with a similar shape. Unlike the Lanxide TM and $C^4$ composites discussed above, the shapes of ceramics and ceramic composites produced by a solid metallic precursor method are influenced by the starting shape of the solid metallic precursor body; that is, a shaped ceramic crucible or a shaped ceramic oxidant is not necessarily required to form a shaped ceramic body. The solid metallic precursor method has been used to date to produce shaped electronic ceramics or electronic ceramic composites. To date, however, the solid metallic precursor method has only been used with precursors that contain elements that themselves tend to oxidize at a relatively rapid rate. For example, precursors to superconductors tend to contain alkaline-earth elements along with copper, a rare-earth element, thallium or bismuth (e.g., $REBa_2Cu_3O_{7-x}$ [RE=rare earth element such as Y, Yb, Nd, etc.], $(Bi,Pb)_2Sr_2Ca_2Cu_3O_{10\pm z}$, $TlBa_2Ca_2Cu_3O_z$). G. J. Yurek, J. B. Vander Sande, W.-X. Wang, D. A. Rudman, "Direct Synthesis of a Metal/Superconducting Oxide Composite by Oxidation of a Metallic Precursor," *J. Electrochem. Soc.*, Vol. 134, 1987, pp. 2635–2636. Because copper, thallium, bismuth, and rare-earth elements do not tend to form protective, slow-growing oxide scales during high-temperature oxidation, thick superconducting films or bulk superconducting bodies can be produced in reasonable times by oxidizing precursors containing these elements. Precursors to dielectric ceramics have also been produced by the oxidation of solid metallic precursors; for example, dielectric oxide/noble metal tapes (e.g., $BaTiO_3/Ag$ and $BaTiO_3/Pd$) have been synthesized by the oxidation of solid Ba—Ti-bearing metal precursors. K. H. Sandhage, M. M. Antony, H. J. Schmutzler, "Synthesis of Ferroelectric Ceramics by the Oxidation of Metallic Precursors," *Ceramic Transactions*, Vol. 32, 1993, pp. 49–59. However, these precursors contain, in addition to an alkaline earth metal, metallic titanium, which oxidizes at a relatively rapid rate above $\approx 700°$ C.

The solid metal precursor method has, to date, only been successful at producing electronic ceramics or electronic ceramic composites from metallic precursors containing elements that do not tend to form protective, slow growing oxide scales; that is, the synthesis of ceramic or ceramic composite bodies from solid metallic precursors containing, for example, aluminum, silicon, or chromium has not been demonstrated. The feasibility of oxidizing a solid metallic precursor to produce dense, shaped structural ceramics or structural ceramic composites or, more particularly, dense, shaped refractory structural ceramics or refractory structural ceramic composites, has also not been determined. Many refractory ceramic compounds which have been used or considered for use in structural ceramic components contain one or more of the elements aluminum, silicon, or chromium. Aluminum, silicon, or chromium, and a variety of nickel-based, iron-based, and cobalt-based alloys containing one or more of the elements aluminum, silicon, or chromium, tend to oxidize at a slow rate below 1200° C. in oxygen or air due to the formation of adherent, continuous, slow-growing oxide scales ($Al_2O_3$, $SiO_2$, or $Cr_2O_3$). Hence, it is not obvious that thick, shaped structural ceramic components containing aluminum, silicon, or chromium-bearing ceramic compounds can be produced by a solid metallic precursor method.

Another general method for fabricating structural ceramic components with complex shapes is to join together several structural ceramic bodies, or structural ceramic composite bodies, of simpler shape. Indeed, in some structural applications, chemically dissimilar ceramic-bearing bodies must be joined to form a desired component. A widely used method for joining dissimilar ceramics, or ceramics and metals, is by brazing with an active metal alloy (e.g., Ag—Cu—Ti—In alloys, where Ti is the active metal). Brazing is accomplished by placing the active metal alloy between the ceramic components and heating the assembly in an inert atmosphere or vacuum to melt the alloy. Because the active element in the metallic alloy possesses a strong affinity for oxygen, an oxidation-reduction reaction occurs at the alloy/ceramic interface, which results in bonding of the alloy to the ceramic. Active metal brazing is an inexpensive method for joining ceramics at low temperatures and with little or no applied pressure. Unfortunately, ceramic-to-ceramic bonds produced in this manner are not particularly refractory, owing to the low melting temperatures and poor oxidation resistance of commonly-used active metal alloys. Hence, ceramics joined together by common brazing alloys can not be used in high temperature applications. Other conventional ceramic joining processes either yield low-temperature bonds (e.g., adhesive bonding, silicate brazing), require high-temperature, expensive processing steps (e.g., diffusion bonding by hot pressing or hot isostatic pressing), or yield non-dense bonds that are susceptible to fracture (e.g., cementing). J. D. Cawley, "Joining of Ceramic-Matrix Composites," *Amer. Cer. Soc. Bull.*, Vol. 68, No. 9, 1989, pp. 1619–1623. New, inexpensive methods are needed to produce high-density, high-temperature, refractory bonds between complex-shape bodies of refractory structural ceramics and/or refractory structural ceramic composites at modest temperatures with a minimum number of processing steps.

One object of this invention is to provide shaped structural ceramic bodies and shaped structural ceramic composite bodies by the non-combustive oxidation of metal-bearing precursors that are not completely molten during oxidation. Another object of this invention is to provide shaped refractory structural ceramic bodies and shaped refractory structural ceramic composite bodies by the non-combustive oxidation of metal-bearing precursors that are not completely molten during oxidation. Another object of this invention is to provide shaped ceramic bodies and shaped ceramic composite bodies by the non-combustive oxidation of solid metal-bearing precursors that contain oxidation-resistant metals. Another object is to provide shaped structural ceramic bodies and structural ceramic composite bodies by oxidation without the use of a shaped ceramic crucible or a shaped ceramic oxidant. Another object is to provide a method of making shaped structural ceramic bodies and shaped structural ceramic composite bodies that is reliable and avoids complex handling. Another object is to provide a method of making dense, shaped structural ceramic bodies and structural ceramic composite bodies with the use of heat treatments involving relatively low temperatures. Another object is to provide a reliable, simple method for producing a high-temperature bond between structural ceramic bodies and structural ceramic composite bodies. Another object is to provide a method for producing a high-temperature bond between structural ceramic bodies and structural ceramic composite bodies that involves the use of relatively low temperatures.

BRIEF DISCLOSURE OF INVENTION

This invention relates to a process for preparing a dense, shaped refractory structural ceramic or a dense, shaped refractory structural ceramic composite by the non-combustive oxidation of a solid metal-bearing precursor. The solid metal-bearing precursor method of this invention consists of two general steps: 1) precursor alloying/shaping—a multicomponent metal-bearing precursor, containing the proper ratio of elements for the final ceramic phase(s), is alloyed, consolidated, and formed into a desired geometry, and 2) oxidation/densification—the solid metal-bearing precursor body is oxidized and densified to produce a structural ceramic or structural ceramic composite that retains the shape of the solid metal-bearing precursor. In order to allow for rapid oxidation and minimal volume change during oxidation, the precursors of this invention contain at least one alkaline earth element (Mg, Ca, Sr, Ba, or Ra) or alkali element (H, Li, Na, K, Rb, Cs, Fr) and at least one element that is neither an alkaline earth element nor an alkali element. The method of the present invention is particularly applicable to precursors that contain, in addition to the alkaline-earth metals or alkali metals, oxidation-resistant metals or alloy phases. These are the metals that form dense, adherent oxide films on their surfaces which severely retard the rate of oxidation. As set forth above, these metals include Al, Si, and Cr but are also metals and alloys in which these metals are an alloying ingredient. Such solid metal-bearing precursors may consist of a single metallic phase, a mixture of metallic phases, or a mixture of metallic and ceramic phases. With this method, a structural ceramic composite is produced by partial oxidation, or by complete oxidation, of one or more metallic phases in the solid metal-bearing precursor body. In this invention, the oxidation process can be conducted in a non-combustive manner; that is, steep temperature gradients within the precursor that are generated by a highly exothermic reaction occurring at a rapidly propagating combustion wavefront can be avoided. The oxidant used to transform the metal-bearing precursor into a structural ceramic or structural ceramic composite can be a gas, liquid, or solid phase.

DETAILED DESCRIPTION

A variety of solid-state, liquid-state, or vapor-state processes can be used to alloy and shape solid metal-bearing precursors to structural ceramics and structural ceramic composites. In one embodiment, solid-state mechanical alloying (e.g., vibratory ball milling, ball milling, attritor milling, rod milling, jet milling) is used to produce finely divided precursor powder that, in turn, is compacted and formed into a desired shape by standard deformation processing (e.g., pressing, rolling, extrusion, drawing, stamping, etc.). A shaped metal-bearing precursor can also be produced by casting and solidification of a completely molten metal alloy or a partially-molten slurry containing a molten metal alloy. In one embodiment, planar flow casting (melt spinning) is used to produce a chemically-homogeneous solid metal-bearing precursor in the form of powder, shot, tape, foil, sheet, fiber, or whisker. In another embodiment, a completely-molten or partially-molten metal-bearing precursor is cast and allowed to solidify in a shaped mold. In another embodiment, a shaped metallic precursor coating is obtained by dipping a shaped substrate into a completely or partially-molten metal-bearing precursor. In another embodiment, coatings of shaped metal-bearing precursors are obtained on a shaped substrate by a vapor-state process such as sputtering, laser ablation, plasma spraying, chemical vapor deposition, molecular beam epitaxy, ion implantation, ion beam mixing, or evaporation from one or more metal-bearing targets. In another embodiment, coatings of shaped metal-bearing precursors are obtained on a shaped substrate by solid-state or liquid-state processes, such as co-extrusion, co-rolling, co-drawing, dipping the substrate into a molten or partially-molten alloy and allowing the alloy coating to solidify on the substrate, or flame spraying of the molten or partially-molten alloy onto a substrate.

Oxidation of the shaped metal-bearing precursor may be conducted in a variety of ways. In one embodiment, the shaped metal-bearing precursor is oxidized by being exposed to a gas containing a vapor-phase oxidant such as $O_2$, $N_2$, $S_2$, $CO_2$, or $NO_2$. In another embodiment, the shaped metal-bearing precursor is oxidized by being exposed to an oxidant present as a liquid. In another embodiment, the shaped metal-bearing precursor is oxidized by being exposed to an oxidant present as a solid. In another embodiment, the shaped metal-bearing precursor is oxidized by reaction with a solid or liquid oxidant present in the precursor. In another embodiment, the shaped metal-bearing precursor is oxidized by the application of an electrical potential.

A variety of structural ceramic composites can be synthesized from metal-bearing precursors. In one embodiment, a discontinuous-fiber-reinforced, ceramic-matrix composite is prepared by blending metal-bearing precursor powder with ceramic fibers, compacting and forming the metal-precursor-bearing mixture into a desired shape by deformation processing (e.g., a bar could be produced by rolling), and then completely oxidizing and sintering the shaped metal-bearing precursor to yield a dense, shaped composite. In another embodiment, a continuous-fiber-reinforced ceramic-matrix composite is produced by forming a metal-bearing precursor into several sheets, stacking the sheets in an alternating fashion with layers of continuous ceramic fiber, compacting and forming the laminated precursor body into a desired shape by deformation processing (e.g., by pressing), and then oxidizing and sintering the shaped body to yield a dense, shaped composite. In another embodiment, a molten metal precursor is allowed to infiltrate a shaped, porous ceramic fiber preform. The infiltrated metal precursor is allowed to solidify and is then oxidized to produce a dense, shaped continuous-fiber-reinforced ceramic-matrix composite. In another embodiment, gaseous metal-bearing precursor species are allowed to infiltrate and be deposited inside a shaped, porous ceramic fiber preform. The infiltrated metal precursor is then oxidized to produce a dense, shaped continuous-fiber-reinforced ceramic-matrix composite. In another embodiment, the metal-bearing precursor is completely or partially melted, poured inside a shaped mold, solidified and removed from the mold, and then oxidized to yield a shaped ceramic component. In another embodiment, the metal-bearing precursor is completely or partially melted, and then rapidly solidified (e.g., by melt spinning to yield ribbon, tape, foil, or fibers, or gas atomization to yield fibers, particles, or powders). The rapidly-solidified metal-bearing precursor is then either oxidized to yield a ceramic-bearing object or is subjected to further compaction and deformation processing (e.g., rolling, pressing, extrusion, swaging, drawing) and then oxidized to yield a ceramic-bearing object. In another embodiment, a metal-bearing precursor coating is first applied to a shaped substrate (e.g., by coextrusion with the substrate, by dipping the substrate into a molten alloy of the precursor and then solidifying the precursor coating, by sputtering, by laser ablation, by evaporation, by plasma spraying, by flame spraying, by chemical vapor deposition, by molecular beam epitaxy, by ion beam mixing, or by ion implantation) and then oxidized to produce a ceramic-bearing coating. In another embodiment, the shaped metal-bearing precursor body contains at least one solid oxide phase that acts as an oxidant, so that, upon heat treatment, the oxidant is reduced by an oxidation-reduction reaction with a metal phase to yield a metal-ceramic structural composite body. In another embodiment, certain metal elements in the shaped metal-bearing precursor are selectively oxidized, with at least one other metal element remaining unoxidized, so as to produce a shaped metal-ceramic structural composite. In another embodiment, the shaped metal-bearing precursor is oxidized so as to yield a dense, shaped structural ceramic composite body containing a mixture of ceramic phases.

An important advantage of the solid metal-bearing precursor method is the ability to produce complex-shape monolithic structural ceramics or structural ceramic composites by cost-effective forming operations that are well-suited for large-scale manufacturing. Structural ceramic bodies or structural ceramic composite bodies with a variety of shapes could be produced by oxidizing a shaped, solid metal-bearing precursor. Shapes that can be produced from metal-bearing precursors fabricated by solid-state rolling, drawing, swaging, and extrusion include, but are not limited to, rods, wires, fibers, whiskers, tapes, foils, sheets, tubes, rings, and honeycombs. More complicated shapes could be obtained by pressing or stamping of solid metal-bearing precursors, by casting of liquid metal-bearing precursors into complex-shape molds or dies, and by depositing metal-bearing precursor films or coatings onto complex-shape substrates. With proper choice of the metal-bearing precursor system and with proper control of the precursor microstructure, the oxidation and densification processes can occur rapidly at modest temperatures so as to transform the solid metal-bearing precursor into a structural ceramic body or structural ceramic composite body that retains the shape of the starting metal-bearing precursor.

The preferred metal-bearing precursor systems in this invention are those that contain at least one of the following alkaline earth elements or alkali elements: magnesium, calcium, strontium, barium, radium, hydrogen, lithium, sodium, potassium, rubidium, cesium, and francium (Mg, Ca, Sr, Ba, Ra, H, Li, Na, K, Rb, Cs, and Fr) and at least one element that is neither an alkaline earth element nor an alkali element. The method of the present invention is particularly applicable to precursors that contain, in addition to the alkaline-earth metals or alkali metals, metals or alloy phases that exhibit high temperature oxidation resistance. These are the metals that form dense, adherent oxide films on their surfaces which severely retard the rate of oxidation. As set forth above, these metals include Al, Si, and Cr but are also metals and alloys in which these metals are an alloying ingredient. Such metals are well known to those of ordinary skill in the metallurgical arts. For example, the addition of Cr and/or Al and/or Si to Fe, Ni, or Co significantly enhances the corrosion resistance of these materials by forming such protective oxide scales. Examples of such alloys are the iron-based stainless steels and nickel or cobalt-based superalloys, all of which contain chromium and/or aluminum and/or silicon. An addition of such constituents will tend to enhance the oxidation resistance of a matrix or solvent metal. Amounts as little as a few atomic percent can have a significant effect on the corrosion resistance of base metals such as Fe, Co, and Ni.

An example of such a precursor is a Ba—Al—Si-bearing precursor. Metal-bearing precursor bodies with desired shapes containing such elements can be produced by solid-state, liquid-state, or vapor-state processes. Oxidation of such precursors tends to result in minimal volume change so that the shape of the precursor body is retained. Oxidation of these precursors can occur rapidly in a non-combustive manner so that thick, shaped precursors can be transformed into thick, shaped structural ceramic bodies or thick, shaped structural ceramic bodies in reasonable times. Post-oxidation annealing of these precursors at relatively modest temperatures and/or for relatively short times results in the formation of dense, structural ceramics or dense, structural ceramic composites.

The choice of the metal-bearing precursor system has a strong influence on the volume change of the precursor and the shape of the ceramic produced by the oxidation reaction. The molar volumes of most single component oxides are greater than the molar volumes of the corresponding metal elements consumed in the formation of the oxide. For example, the molar volumes of crystalline silicon, Si, and crystalline silicon dioxide (as quartz), $SiO_2$, at room temperature are approximately 12.1 and 26 $cm^3$/mole, respectively. The ratio of the volume of one mole of silicon dioxide, $V_m(SiO_2)$, to the volume of one mole of silicon, $V_m(Si)$, is given by:

$$V_m(SiO_2)/V_m(Si) = 26/12.1 = 2.1$$

This ratio of molar volumes is known as the Pilling-Bedworth ratio (PBR). That is, $$PBR = V_m(oxide)/\delta \cdot V_m(metal)$$

where $\delta$ = the number of moles of metal consumed to make one mole of the oxide (e.g., one mole of Si is consumed to make one mole of $SiO_2$). The PBR for many metals and metal oxides (such as silicon and silicon dioxide) is significantly greater than one. Hence, the complete oxidation of such metals results in an appreciable increase in volume. Such an increase in volume can cause stresses to develop during the oxidation of a thick metallic body that, in turn, can lead to the formation of macroscopic defects in the resulting oxide (e.g., cracks, pores) and/or spallation of the oxide from the underlying metal during oxidation. For a thick body composed of a metal with a PBR much larger than unity, the shape also tends to be lost after the body is completely oxidized.

Unlike most metals, the PBR values for alkaline earth metals (Mg, Ca, Sr, Ba, Ra) and alkali metals (Li, Na, K, Rb) are less than one. For example, the PBR for metallic barium and barium monoxide, BaO, is given by:

$$V_m(BaO)/V_m(Ba) = 26.81/39.12 = 0.69$$

A key realization in this invention is that the volume change associated with the oxidation reaction can be minimized by using a metal-bearing precursor that contains at least one alkaline earth metal or alkali metal and at least one non-alkaline earth element or non-alkali element. For example, consider the following net reaction for the formation of the ceramic compound barium metasilicate, $BaO \cdot SiO_2$, by the oxidation of a metal precursor consisting of an intimate mixture of fine barium, Ba, and silicon, Si:

$$Ba(s) + Si(s) + 3/2 O_2(g) = BaO \cdot SiO_2(s) \quad (1)$$

(Note: barium metasilicate is a refractory ceramic compound that melts at $\approx 1605°$ C.) In this case, the appropriate ratio of molar volumes of the solid product and reactants is:

$V_m(\text{BaO}, \text{SiO}_2)/[V_m(\text{Ba}) + V_m(\text{Si})] = 48.51/[39.12 + 12.1] = 0.95$ This molar volume ratio for reaction (1) has a value that is closer to one than the PBR for pure barium (0.69) or for pure silicon (2.1). Hence, by choosing metal-bearing precursors that contain an alkaline earth or alkali element and at least one element that is not an alkaline earth or alkali element, the volume change associated with the oxidation reaction can be kept relatively small. The relatively small volume change occurring during the oxidation of such precursors allows for the formation of a ceramic-bearing body that tends to retain the starting precursor shape.

Although the addition of any amount of an alkali metal or alkaline earth metal to a metal precursor disposed to have less molar volume than its oxidized state can beneficially reduce the degree to which such a precursor will expand, an amount less than about 5 atomic percent is unlikely to provide a significant improvement. Additions of at least 10 atomic percent and as much as at least 20 atomic percent are preferred. The maximum such addition is dependant on the exact material employed and the use of the resulting refractory ceramic intended. Although amounts up to 95 atomic percent may be effective under some circumstances, it would be unusual to employ amounts greater than about 50 atomic percent.

The volume change due to the oxidation of a completely metallic precursor containing the preferred elements described above can be further reduced (to nearly zero) by replacing some of the metallic elements in the precursor with ceramic phases containing these elements. For example, consider the formation of barium metasilicate by the oxidation of a precursor consisting of 39 at % metallic barium, 50 at % metallic silicon, and 11 at % barium monoxide, BaO. The net oxidation reaction in this case is given by:

$$0.78\text{Ba}(s) + \text{Si}(s) + 0.22\text{BaO}(s) + 1.39\text{O}_2(g) = \text{BaO} \cdot \text{SiO}_2(s) \quad (2)$$

The ratio of the molar volume of the solid product to the sum of molar volumes of the reactants is:

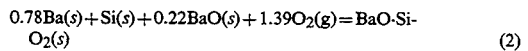

$V_m(\text{BaO} \cdot \text{SiO}_2)/[0.78 \cdot V_m(\text{Ba}) + V_m(\text{Si}) + 0.22 \cdot V_m(\text{BaO})] = 48.51/[0.78 \cdot 39.12 + 12.1 + 0.22 \cdot 26.8] = 1.0$ Hence, by carefully tailoring the ratio of metal and ceramic phases in a metal-bearing precursor containing the preferred elements, one can produce a desired ceramic phase, or mixture of phases, with a molar volume that is very close to that of the starting precursor. As a result, structural ceramics and structural ceramic composites can be produced in desired shapes without the use of appreciable (and costly) machining.

In order to produce a thick structural ceramic body or a thick structural ceramic composite body rapidly from a shaped metal-bearing precursor, the metal-bearing precursor must oxidize at a relatively rapid rate, preferably at a modest temperature. Combustive oxidation should be avoided, however, in order to retain the shape of the metal-bearing precursor and to avoid the generation of undesired defects (cracks, pores, undesired chemical reactions, etc.) in the final structural ceramic body or final structural ceramic composite body resulting from high internal temperatures and/or steep temperature gradients within the precursor. At modest temperatures (e.g., in the range of 25° to 500° C.), alkaline earth metals such as barium, strontium, calcium, and magnesium oxidize (and nitridize) rapidly. For these metals, an initial, brief period of relatively slow oxide growth is often observed to be followed by prolonged, non-combustive oxidation at a relatively rapid, linear rate with time. O. Kubaschewski, B. E. Hopkins, *Oxidation of Metals and Alloys*, Second Edition, Butterworth, London, 1962, pp. 40, 213; M. S. Chandrasekharaiah. J. L. Margrave, "The Kinetics of Oxidation and Nitridation of Lithium, Calcium, Strontium, and Barium," *J. Electrochem. Soc.*, Vol. 108, 1961, pp. 1008–1012. Metal-bearing precursors containing alkaline earth metals or alkali metals are attractive in that such precursors can exhibit a relatively rapid rate of oxidation at modest temperatures, particularly if the non-alkaline-earth or non-alkali elements in the precursor do not tend to form protective, slow-growing oxide scales. For example, alkaline-earth-bearing precursors to superconducting oxides (e.g., Y—Ba—Cu precursors to $\text{YBa}_2\text{Cu}_3\text{O}_y$, Bi—Sr—Ca—Cu precursors to $\text{Bi}_2\text{Sr}_2\text{Ca}_1\text{Cu}_2\text{O}_y$) and alkaline-earth-bearing precursors to dielectric oxides (e.g., Ba—Ti precursors to $\text{BaTiO}_3$) have been found to oxidize rapidly at modest temperatures ($\leq 500°$ C.). K. H. Sandhage, M. M. Antony, H. J. Schmutzler, "Synthesis of Ferroelectric Ceramics by the Oxidation of Metallic Precursors," *Ceramic Transactions*, Vol. 32, 1993, pp. 49–59. However, the non-alkaline-earth elements in the metallic precursors to these multicomponent oxides (metallic copper, yttrium, bismuth, lead, titanium) do not tend to form adherent, protective oxide scales that severely retard the rate of oxidation.

If the alkaline-earth-metal-bearing or alkali-metal-bearing precursor contains an element that tends to form a protective, slow-growing oxide scale, then the phase content and distribution of phases in the metal-bearing precursor need to be carefully controlled to allow for rapid and complete oxidation of the precursor. Precursors containing aluminum, silicon, or chromium are particularly susceptible to the formation of slow-growing aluminum oxide, silicon oxide, or chromium oxide scales, respectively, during oxidation. Indeed, aluminum, silicon, and/or chromium are added to commercial nickel-based, iron-based, and cobalt-based superalloys to dramatically enhance oxidation resistance. In order to ensure for rapid and complete oxidation of aluminum, silicon, or chromium-bearing precursors in this invention, the metal phases containing appreciable aluminum, silicon, or chromium should be present as discontinuous phases that are relatively fine in scale. In a preferred embodiment, metal phases that are rich in aluminum and/or silicon and/or chromium are distributed as discrete particles in the alkaline-earth-bearing or alkali-bearing precursor. If such aluminum, silicon, or chromium-bearing phases are present as discrete particles in an alkaline-earth-bearing or alkali-bearing matrix, then rapid oxidation of the metal-bearing precursor should still be possible, even if continuous, slow-growing oxide scales form around each fine particle. In another preferred embodiment, elements that tend to form slow-growing oxide scales (such as aluminum, silicon, or chromium) are present in part as oxidized species in the alkaline-earth-bearing or alkali-bearing precursor; an example of this embodiment would be a precursor consisting of a mixture of metallic magnesium, silicon, and silicon dioxide.

In addition to the ability to form complex-shape structural ceramic components, the solid metal-bearing precursor approach also allows for the formation of refractory ceramic compounds by novel, low-temperature reaction paths. For example, intermediate carbonate or hydroxide compounds (e.g., $BaCO_3$, $Ba(OH)_2$), such as can be found in processes that involve the use of organic materials (e.g., organic binders, plasticizers, etc.), can be avoided by a solid metal-bearing precursor route. Hence, the reaction path for the formation of multicomponent oxides from metal-bearing precursors can avoid the formation or decomposition of carbonate or hydroxide phases. Since the oxidation of a chemically homogeneous precursor tends to yield a finely-divided, highly-reactive mixture of ceramic phases, a multicomponent ceramic phase can be formed at relatively low temperatures.

The syntheses of dense structural ceramics and structural ceramic composites at relatively low temperatures are desired to reduce processing costs and to avoid undesired defects (e.g., undesired chemical reactions between ceramic fibers and a ceramic matrix in a composite). Ceramic grains formed by oxidation at moderate temperatures (eg., $\leq 500°$ C.) tend to be quite fine (submicron). Fine-grained ceramics exhibit an enhanced rate of sintering. Hence, metal-bearing precursors that oxidize rapidly at a modest temperature can also exhibit an enhanced rate of densification during post-oxidation annealing. Since an intimate mixture of precursor oxide phases can be produced by the oxidation of multicomponent metal-bearing precursors, the rate of densification may be further enhanced by a reactive sintering process.

A wide variety of refractory ceramic compounds that are used, or may be considered for use, in structural applications contain alkaline earth elements or alkali elements. Examples of such refractory ceramic compounds (all of which possess melting points in excess of 1200° C.) include, but are not limited to:

| | |
|---|---|
| aluminates | (e.g., $MgO \cdot Al_2O_3$, $CaO \cdot 6Al_2O_3$, $Ca \cdot 2Al_2O_3$, $CaO \cdot Al_2O_3$, $12CaO \cdot 7Al_2O_3$, $3CaO \cdot Al_2O_3$, $SrO \cdot 6Al_2O_3$, $SrO \cdot 2Al_2O_3$, $SrO \cdot Al_2O_3$, $3SrO \cdot Al_2O_3$, $4SrO \cdot Al_2O_3$, $5SrO \cdot Al_2O_3$, $BaO \cdot 6Al_2O_3$, $BaO \cdot Al_2O_3$, $3BaO \cdot Al_2O_3$, $Li_2O \cdot Al_2O_3$, $Li_2O \cdot 11Al_2O_3$, $Na_2O \cdot Al_2O_3$, $Na_2O \cdot Al_2O_3$, $Na_2O \cdot 11Al_2O_3$, $K_2O \cdot Al_2O_3$, $K_2 \cdot 11Al_2O_3$) |
| silicates | (e.g., $2MgO \cdot SiO_2$, $MgO \cdot SiO_2$, $3Cao \cdot SiO_2$, $2CaO \cdot SiO_2$, $3CaO \cdot 2SiO_2$, $CaO \cdot SiO_2$, $3SrO \cdot SiO_2$, $2SrO \cdot SiO_2$, $SrO \cdot SiO_2$, $2BaO \cdot SiO_2$, $BaO \cdot SiO_2$, $BaO \cdot 2SiO_2$, $3BaO \cdot 5SiO_2$, $5BaO \cdot 8SiO_2$, $2BaO \cdot 3SiO_2$, $2Li_2O \cdot SiO_2$,) |
| alumino-silicates | (e.g., $2MgO \cdot 2Al_2O_3 \cdot 5SiO_2$, $4MgO \cdot 5Al_2O_3 \cdot 2SiO_2$, $CaO \cdot Al_2O_3 \cdot 2SiO_2$, $2CaO \cdot Al_2O_3 \cdot SiO_2$, $SrO \cdot Al_2O_3 \cdot 2SiO_2$, $2SrO \cdot Al_2O_3 \cdot SiO_2$, $6SrO \cdot 9Al_2O_3 \cdot 2SiO_2$, $BaO \cdot Al_2O_3 \cdot 2SiO_2$, $Na_2O \cdot Al_2O_3 \cdot 2SiO_2$, $Li_2O \cdot Al_2O_3 \cdot SiO_2$, $Li_2O \cdot Al_2O_3 \cdot 4SiO_2$, $Li_2O \cdot Al_2O_3 \cdot 8SiO_2$, $K_2O \cdot Al_2O_3 \cdot 2SiO_2$, $K_2O \cdot Al_2O_3 \cdot 4SiO_2$, $Cs_2O \cdot Al_2O_3 \cdot 4SiO_2$) |
| chromates | (e.g., $MgO \cdot Cr_2O_3$, $CaO \cdot Cr_2O_3$) |
| alumino-chromates | (e.g., $MgO \cdot (Al, Cr)_2O_3$, $CaO \cdot (Al, Cr)_2O_3$) |
| zirconates | (e.g., $(Mg, Zr)O_2$, $(Ca,Zr)O_2$, $CaO \cdot ZrO_2$, $SrO \cdot ZrO_2$, $4SrO \cdot 3ZrO_2$, $3SrO \cdot 2ZrO_2$, $2SrO \cdot ZrO_2$, $BaO \cdot ZrO_2$) |
| niobates | (e.g., $5BaO \cdot 2Nb_2O_5$, $BaO \cdot Nb_2O_5$, $3BaO \cdot 5Nb_2O_5$, $6BaO \cdot 7Nb_2O_5$, $BaO \cdot Nb_2O_5$, $(Ba,Nb)_2O_5$, $CaO \cdot Nb_2O_5$, $2CaO \cdot Nb_2O_5$, $3CaO \cdot Nb_2O_5$, $Na_2O \cdot Nb_2O_5$, $4Na_2O \cdot Nb_2O_5$, $7Na_2O \cdot Nb_2O_5$, $10Na_2O \cdot Nb_2O_5$, $3K_2O \cdot 22Nb_2O_5$, $K_2O \cdot 3Nb_2O_5$, $2Cs_2O \cdot 15Nb_2O_5$, $5Cs_2O \cdot 13Nb_2O_5$) |
| ferrites | (e.g., $MgO \cdot Fe_2O_3$, $(Mg,Fe)O$, $2CaO \cdot Fe_2O_3$, $CaO \cdot Fe_2O_3$, $CaO \cdot 2Fe_2O_3$, $(Ca,Fe)O$, $2BaO \cdot Fe_2O_3$, $BaO \cdot Fe_2O_3$, $BaO \cdot 6Fe_2O_3$, $Li_2O \cdot Fe_2O_3$, $2Li_2O \cdot 10Fe_2O_3$) |
| borates | (e.g., $2MgO \cdot B_2O_3$, $3MgO \cdot B_2O_3$, $3BaO \cdot B_2O_3$, $2CaO \cdot B_2O_3$, $3CaO \cdot B_2O_3$, $3SrO \cdot B_2O_3$) |
| germanates | (e.g., $4MgO \cdot GeO_2$, $2MgO \cdot GeO_2$, $1MgO \cdot GeO_2$, $2CaO \cdot GeO_2$, $CaO \cdot GeO_2$, $2CaO \cdot 3GeO_2$, $CaO \cdot 2GeO_2$, $3BaO \cdot GeO_2$, $2BaO \cdot GeO_2$, $BaO \cdot GeO_2$, $2SrO \cdot GeO_2$, $SrO \cdot GeO_2$, $SrO \cdot 2GeO_2$, $2Li_2O \cdot GeO_2$, $Li_2O \cdot GeO_2$) |
| phosphates | (e.g.. $3MgO \cdot P_2O_5$, $2MgO \cdot P_2O_5$, $MgO \cdot P_2O_5$, $2CaO \cdot P_2O_5$, $3CaO \cdot P_2O_5$, $CaO \cdot P_2O_5$, $4SrO \cdot P_2O_5$, $10SrO \cdot 3P_2O_5$, $3SrO \cdot P_2O_5$, $2SrO \cdot P_2O_5$, $3Na_2O \cdot P_2O_5$) |
| nitrides | (e.g., $CaAlSiN_3$) |

The solid metal-bearing precursor method has been used by the inventor to produce dense, shaped bodies containing the high-temperature silicate compound known as celsian, $BaO \cdot Al_2O_3 \cdot 2SiO_2$, at modest temperatures ($\leq 1260°$ C.). Celsian is an attractive high-temperature matrix phase for ceramic composites, owing to its high melting temperature (1760° C.), good oxidation resistance, and modest thermal expansion coefficient ($2.7 \times 10^{-6}/°C$. from 20° to 1000° C.). Celsian is also chemically compatible with alumina fibers, which makes celsian an attractive matrix phase for alumina-fiber-reinforced composites.

Complex-shape structural ceramic components can also be produced by joining structural ceramic bodies or structural ceramic composite bodies with relatively simple shapes. Hence, another embodiment of this invention is to use a metal-bearing precursor to produce ceramic bonds between structural ceramic bodies or structural ceramic composite bodies. This embodiment is a simple, yet significant modification of existing brazing technology for forming metal-to-ceramic bonds. A ceramic bond can be formed from a solid metal-bearing precursor by: 1) sandwiching an active metal alloy between two ceramic components, and then heating in an inert or vacuum environment, followed by 2) complete oxidation of the active metal alloy in an oxidizing atmosphere. This process is illustrated schematically in FIG. 1. The ceramic components are chemically bonded to the active metal alloy in the first step by red-ox (reduction-oxidation) reactions at the ceramic/metal interfaces. The active metal alloy is then partially or completely transformed into a high-temperature ceramic phase (or phases) by oxidation with an external oxidizing agent (e.g., $O_2$ gas) in the second step. This joining process is generally applicable for metal-bearing precursor bonding agents that: 1) contain at least one unoxidized element that can be oxidized by reaction with the ceramic-bearing body to be joined (e.g., an element with a high affinity for oxygen that can be oxidized by reduction of an oxide ceramic), 2) can be completely or partially oxidized by exposure to an external oxidant, and 3) can be transformed by post-oxidation annealing into a structural ceramic compound or a mixture of structural ceramic compounds. These requirements are satisfied by the metal-bearing bonding agents in the present invention, since alkaline-earth or alkali metals possess a high affinity for oxygen and can be oxidized rapidly at modest temperatures upon exposure to an external oxidant (such as gaseous $O_2$) and can be transformed into refractory structural ceramic compounds. The high-temperature bonds produced by this method could contain a wide variety of refractory alkaline-earth-bearing or alkali-bearing ceramic compounds (see list above). For example, zirconia-bearing bodies could be joined by using a Ca—Zr-bearing bonding agent to produce a bond containing the refractory compound $CaO \cdot ZrO_2$. Alumina-bearing bodies could be joined by using a Ba—Al—Si-bearing bonding agent to produce a bond containing the refractory compound $BaO \cdot Al_2O_3 \cdot 2SiO_2$. Silicon-nitridebearing bodies could be joined by using a Ca—Al—Si-bearing bonding agent to produce a bond containing the refractory compound $CaAlSiN_3$. The ceramic bonds produced by this method could be composed of a single ceramic compound or a mixture of ceramic compounds; in the latter case, a ceramic composite bond would be produced. The formation of metal-to-ceramic bonds by the use of active filler metals and the preparation of ceramics by the oxidation of metallic precursors have each been separately reported by several authors, as discussed above. The novelty of the reliable and simple joining embodiment of this invention lies in combining these processes to yield a high-temperature bond between ceramic components.

The joining embodiment described above has been used by the inventor to produce a ceramic bond containing the high-temperature compound $BaO \cdot Al_2O_3 \cdot 2SiO_2$ between plates of the compound mullite, $3Al_2O_3 \cdot 2SIO_2$.

Embodiments of the present invention are further described by way of the following examples.

EXAMPLE 1

A dense tape composed of the compound celsian, $BaO \cdot Al_2O_3 \cdot 2SiO_2$, has been produced as follows. Ba—Al—Si metallic precursor powder was prepared by mechanical alloying of elemental barium, aluminum, and silicon. The elemental aluminum and silicon were in the form of powders with average particle sizes of 10 and 5 $\mu$m, respectively. The elemental barium was in the form of flakes that were 1 to 10 mm in length and <1 mm thick. 1,309 grams of aluminum powder and 1,361 grams of silicon powder were first added to a 3.8 dia. stabilized-zirconia jar, along with 2, 1 cm diameter balls of stabilized-zirconia and 20 ml of dry hexane. These additions were made inside a dry glove box purged with an argon atmosphere. The zirconia jar was sealed and then placed in a high-energy, vibratory ball mill. Ball milling was conducted for 4 hours. The sealed stabilized-zirconia jar was then opened in the glove box, and 3,330 grams of barium flakes were added to the jar. The stabilized zirconia jar was then resealed, placed back in the vibratory ball mill, and milling was conducted for another 1 hour. The stabilized zirconia jar was then placed back inside the glove box, and the resulting Ba—Al—Si powder was removed from the jar. Approximately 4 grams of the Ba—Al—Si powder were placed inside a one-end-closed silver tube. The silver tube possessed an inner diameter of 0.93 cm and an outer diameter of 1.03 cm. After loading the Ba—Al—Si powder into the silver tube, the tube was evacuated and welded shut. The sealed tube was then rolled into a tape at room temperature. After every 50% reduction in the tape thickness, the tape was heated for 1 hour at 300° C. in a vacuum oven. After rolling the silver-sheathed tape to a final thickness of 0.29 mm, the tape was cut into 1 cm lengths that were then subjected to an oxidation heat treatment. Oxidation was conducted by exposing the tapes in a pure oxygen atmosphere at 300° C. for 24 hours, then heating at 1° C./min to 500° C., holding at 500° C. for 12 hours, then heating to 900° C. at 1° C./min, and holding at 900° C. for 10 hours. The silver sheath was then peeled away from the oxidized core. The Ba—Al—Si-bearing oxide tape was then sandwiched between two pieces of palladium foil. The specimen was then placed under a modest uniaxial pressure of 200 psi (to keep the palladium foil in contact with the Ba—Al—Si oxide tape) and heated from 900° to 1000° C. at 1° C./min, then from 1000° to 1200° C. at 1° C./hr, then held at 1200° C. for 54 hours. This heat treatment resulted in the transformation of the Ba—Al—Si tape into the celsian polymorph of the compound $BaO \cdot Al_2O_3 \cdot 2SiO_2$. The resulting celsian/Pd laminate was >99% dense; the celsian core of this laminate retained the tape shape of the starting Ba—Al—Si metallic precursor.

EXAMPLE 2

A ceramic composite tape containing corundum, $Al_2O_3$, and celsian, $BaO \cdot Al_2O_3 \cdot 2SiO_2$, has been produced from a Ba—Al—Si-bearing precursor tape. A precursor powder consisting of alumina ($Al_2O_3$), barium, silicon, and silica ($SiO_2$) was produced by mechanical alloying. The starting alumina, silicon, and silica powders possessed average particle sizes of 1, 5, and 2 microns, respectively. The elemental barium was in the form of flakes that were 1 to 10 mm in length and <1 mm thick. 2.472 grams of alumina powder, 0.3405 grams of silicon powder, and 2.1852 grams of silica powder were first added to a 3.8 cm dia. stabilized-zirconia jar, along with 2, 1 cm diameter balls of stabilized-zirconia and 20 ml of dry hexane. These additions were made inside a dry glove box purged with an argon atmosphere. The zirconia jar was sealed and then placed in a high-energy, vibratory ball mill. Ball milling was conducted for 1 hour. The sealed stabilized-zirconia jar was then opened in the glove box, and 3.330 grams of barium flakes were added to the jar. The stabilized zirconia jar was then resealed, placed back in the vibratory ball mill, and milling was conducted for another 1 hour. The stabilized zirconia jar was then placed back inside the glove box, and the resulting Ba—$Al_2O_3$—Si—$SiO_2$ powder was removed from the jar. Approximately 3 grams of the Ba—$Al_2O_3$—Si—$SiO_2$ powder was placed inside a one-end-closed silver tube. The silver tube possessed an inner diameter of 0.93 cm and an outer diameter of 1.03 cm. After loading the powder into the silver tube, the tube was evacuated and welded shut. The sealed tube was then rolled into a tape at room temperature. After every 50% reduction in the tape thickness, the tape was heated for 1 hour at 300° C. in a vacuum oven. After rolling the silver-sheathed tape to a final thickness of 0.19 mm, the tape was cut into 1 cm lengths that were then subjected to an oxidation heat treatment. Oxidation was conducted by exposing the tapes in an oxygen atmosphere at 300° C. for 24 hours, then heating at 1° C./min to 500° C., holding at 500° C. for 10 hours, then heating at 5° C./min to 700° C., and holding at 700° C. for 2 hours. The silver sheath was then peeled away from the oxidized core. The Ba—Al—Si-bearing oxide tape was then sandwiched between two pieces of palladium foil. The specimen was then placed under a modest uniaxial pressure of 200 psi (to keep the palladium foil in contact with the Ba—Al—Si oxide tape) and heated to 1150° C. for 5 hours. This heat treatment resulted in the transformation of the Ba—$Al_2O_3$—Si—$SiO_2$ tape into a composite tape containing particles of corundum, $Al_2O_3$, in a matrix containing the compound $BaO \cdot Al_2O_3 \cdot 2SiO_2$. The resulting composite tape was >99% dense.

EXAMPLE 3

This example is similar to example 2, except that the Ba—$Al_2O_3$—Si—$SiO_2$ powder contains an excess of $Al_2O_3$ beyond that required to form the compound $BaO \cdot Al_2O_3 \cdot 2SiO_2$. Hence, after oxidation and densification, the final dense, shaped composite consists of only two compounds: $Al_2O_3$ and $BaO \cdot Al_2O_3 \cdot 2SiO_2$.

EXAMPLE 4

A ceramic composite rod containing fibers of corundum, $Al_2O_3$, and a matrix of celsian, $BaO \cdot Al_2O_3 \cdot 2SiO_2$, may be produced from a Ba—Al—Si-bearing precursor as follows. A precursor powder consisting of alumina ($Al_2O_3$), barium, silicon, and silica, ($SiO_2$), with a molar ratio of Ba:Al:Si = 1:2:2 is first produced by mechanical alloying. The starting alumina, silicon, and silica are in the form of powders. The elemental barium is in the form of flakes. Alumina powder, silicon powder, and silica powder are first added to a 3.8 cm diameter stabilized-zirconia jar, along with 2, 1 cm diameter balls of stabilized zirconia and 20 ml of dry hexane. These additions are made inside a dry glove box purged with an argon atmosphere. The zirconia jar is sealed and then placed in a high-energy, vibratory ball mill. After ball milling for 4 hours, the sealed stabilized-zirconia jar is then opened in the glove box, and barium flakes are added to the jar. The stabilized zirconia jar is then resealed, placed back in the vibratory ball mill, and milling is conducted for another 1 hour. The stabilized zirconia jar is then placed back inside the glove box, and the resulting Ba—$Al_2O_3$—Si—$SiO_2$ powder is removed from the jar. The Ba—$Al_2O_3$—Si—$SiO_2$ powder is then mixed with alumina fibers and the mixture is placed inside a one-end-closed silver tube. After loading the powder into the silver tube, the tube is evacuated and welded shut. The sealed tube is then extruded into a rod. The metallic elements in the rod are then oxidized by exposing the rod to an oxygen atmosphere at 300° C., then at 500° C., then at 900° C. The silver sheath is then peeled away from the oxidized core. The specimen is then transformed into an alumina-fiber-reinforced, celsian-matrix composite by heating in air at 1200° C. for 54 hours, followed by heating at 1260° C. for 48 hours.

EXAMPLE 5

A ceramic tube consisting of celsian, $BaO \cdot Al_2O_3 \cdot 2SiO_2$, may be produced from a cast Ba—Al—Si-bearing precursor. A precursor powder consisting of aluminum, barium, and silicon with a molar ratio of Ba:Al:Si = 1:2:2 is first produced by mechanical alloying, as discussed above. The powder is melted in an iron or stainless steel crucible by heating to $\geq 1040°$ C. in a vacuum, inert, or reducing gas atmosphere (e.g., argon, helium, hydrogen). The molten alloy is then poured into an iron or stainless steel mold with a tubular cavity and allowed to solidify. After removal from the mold, the Ba—Al—Si tube is oxidized by exposing the tube to an oxygen atmosphere at 300°-1000° C. The oxidized tube is then transformed into a celsian-bearing tube by heating to $\geq 1100°$ C.

EXAMPLE 6

A ceramic composite tube consisting of alumina fibers in a matrix of celsian, $BaO \cdot Al_2O_3 \cdot 2SiO_2$, may be produced from a melt-cast Ba—Al—Si-bearing precursor. A precursor powder consisting of aluminum, barium, and silicon with a molar ratio of Ba:Al:Si = 1:2:2 is first produced by mechanical alloying, as discussed above. The powder is melted in an iron or stainless steel crucible by heating to $\geq 1040°$ C. in a vacuum, inert, or reducing gas atmosphere (e.g., argon, helium, hydrogen). The molten alloy is then cast into an iron or stainless steel mold with a tubular cavity, inside of which is packed a porous, tubular alumina fiber preform. After infiltration of the molten metal into the porous alumina fiber preform, the molten metal is allowed to solidify. The mold is then removed and the resulting Ba—Al—Si metal precursor/alumina fiber composite tube is oxidized by exposing the tube to an oxygen atmosphere at 300°-1000° C. The oxidized tube is then transformed into an alumina-fiber-reinforced, celsian-matrix tube by heating in the range of 1100° to 1300° C.

EXAMPLE 7

A high-temperature Ba—Al—Si—O bond between plates of mullite, $3Al_2O_3 \cdot SiO_2$, has been produced as follows. Elemental Ba, Al, and Si were mechanically alloyed in a cryogenic rod mill to form a powder. Al and Si powder were first placed inside a polycarbonate container with steel endcaps. Milling was conducted under liquid nitrogen by vibrating a 1 cm dia steel rod inside a sealed polycarbonate container at a rate of 2 Hz for 4 hours. The sealed polycarbonate container was then opened in the glove box, and barium flakes were added to the jar. The container was then resealed, placed back in the cryogenic rod mill, and milling was conducted for another 1 hour. The container was then placed back inside the glove box, and the resulting Ba—Al—Si powder was removed. The alloyed powder was packed into a silver tube, which was evacuated and welded shut. The packed tube was then rolled into a sheet. The silver was then peeled away to yield a 100-micron thick Ba—Al—Si tape. The Ba—Al—Si precursor sheet was then sandwiched between two mullite plates. The sandwich specimen was placed under a modest uniaxial pressure of approximately 200 psi (to maintain good contact between the Ba—Al—Si sheet and the mullite plates) and then exposed to the following heat treatment in air: heating at 20° C./min from room temperature to 600° C., then heating at 15° C./min from 600° to 1050° C., then heating at 4° C./min from 1050° to 1230° C. The sandwich specimen was then held at 1230° C. for 5 hours. This heat treatment resulted in the oxidation of the Ba—Al—Si core and the formation of the compound $BaO \cdot Al_2O_3 \cdot 2SiO_2$. The Ba—Al—Si—O core was found to adhere strongly to the mullite plates. The bonded specimen was fractured by applying a shear stress to the bonded interfaces at both room temperature and 1000° C. The resulting fracture was observed to occur within the mullite plates or within the oxidized Ba—Al—Si sheet; that is, the fracture was not observed to occur along the interfaces between the oxidized Ba—Al—Si sheet and the mullite, which indicates that the interfacial bond was relatively strong.

EXAMPLE 8

A high-temperature composite bond, containing mullite, $3Al_2O_3 \cdot SiO_2$, and celsian phases, can be produced between plates of mullite as follows. Elemental Ba, Al, $Al_2O_3$, Si, and $SiO_2$ can be mechanically alloyed in a vibratory ball mill for >4 hours to form a powder. The molar ratio of the metallic barium, aluminum, and silicon in the precursor powder is Ba:Al:Si = 1:2:2. The molar ratio of alumina to silica powder in the precursor is $Al_2O_3/SiO_2 = 3:2$. The powder is packed into a silver tube, which is evacuated and welded shut. The packed tube is then rolled into a sheet. The silver is then peeled away to yield a Ba—Al—Si—$Al_2O_3$—$SiO_2$ sheet. The Ba—Al—Si—$Al_2O_3$—$SiO_2$ sheet is then sandwiched between two mullite plates. The sandwich specimen was placed under a modest uniaxial pressure of approximately 200 psi (to maintain good contact between the Ba—Al—Si—$Al_2O_3$—$SiO_2$ sheet and the mullite plates) and then exposed to an oxidizing heat treatment in air from 600° to 1300° C. to form a composite bond between the mullite plates that contains the compounds mullite, $3Al_2O_3 \cdot SiO_2$, and celsian, $BaO \cdot Al_2O_3 \cdot 2SiO_2$.

EXAMPLE 9

A dense tape composed of the compound celsian, $CaO \cdot Al_2O_3 \cdot 2SiO_2$, can be produced as follows. Ca—Al—Si metallic precursor powder with a molar ratio of Ca:Al:Si=1:2:2 can be prepared by mechanical alloying of elemental calcium, aluminum, and silicon. The elemental aluminum and silicon are in the form of powders, while the elemental barium is in the form of flakes or granules. 2.155 g of aluminum powder and 2.243 grams of silicon powder are first added to a 3.8 dia. stabilized-zirconia jar, along with 2, 1 cm diameter balls of stabilized-zirconia and 20 ml of dry hexane. These additions were made inside a dry glove box purged with an argon atmosphere. The zirconia jar is sealed and then placed in a high-energy, vibratory ball mill. Ball milling is conducted for 4 hours. The sealed stabilized-zirconia jar is then opened in the glove box, and 1.601 grams of calcium are added to the jar. The stabilized zirconia jar is then resealed, placed back in the vibratory ball mill, and milling is conducted for another 1 hour. The stabilized zirconia jar is then placed back inside the glove box, and the resulting Ca—Al—Si powder is removed from the jar. Approximately 4 grams of the Ca—Al—Si powder are placed inside a one-end-closed silver tube. The silver tube possessed an inner diameter of 0.93 cm and an outer diameter of 1.03 cm. After loading the Ca—Al—Si powder into the silver tube, the tube is evacuated and welded shut. The sealed tube is then rolled into a tape at room temperature. After every 50% reduction in the tape thickness, the tape is heated for 1 hour at 300° C. in a vacuum oven. After rolling the silver-sheathed tape to a final thickness of 0.3 mm, the tape is cut into 1 cm lengths that are then subjected to an oxidation heat treatment. Oxidation is conducted by exposing the tapes in a pure oxygen atmosphere at 300° C. for 24 hours, then heating at 1° C./min to 500° C., holding at 500° C. for 12 hours, then heating to 900° C. at 1° C./min, and holding at 900° C. for 10 hours. The silver sheath is then peeled away from the oxidized core. The Ca—Al—Si-bearing oxide tape is then sandwiched between two pieces of palladium foil. The specimen is then placed under a modest uniaxial pressure of 200 psi (to keep the palladium foil in contact with the Ca—Al—Si oxide tape) and heated from 900° to 1000° C. at 1° C./min, then from 1000° to 1200° C. at 1° C./hr, then held at 1200° C. for 54 hours. This heat treatment transforms the Ca—Al—Si tape into the compound anorthite, $CaO \cdot Al_2O_3 \cdot 2SiO_2$.

EXAMPLE 10

A ceramic-metal composite tape containing aluminum, Al, and barium orthosilicate, $Ba_2SiO_4$, can be produced from a Ba—Al—Si-bearing precursor tape as follows. A precursor powder consisting of aluminum, barium, and silicon can be produced by mechanical alloying of barium granules with aluminum and silicon powder in a vibratory ball mill. In order to produce a $Ba_2SiO_4/Al$ composite, the elemental ratio of Ba:Si in the precursor should be 2:1. The mechanically alloyed powder can be placed inside a one-end-closed silver tube. After loading the powder into the silver tube, the tube can be evacuated and welded shut. The sealed tube should then be rolled into a tape at room temperature. After every 50% reduction in the tape thickness, the silver-sheathed tape should be heated for 1 hour at 300° C. in a vacuum oven. After rolling is completed, the silver sheath should be removed by grinding or peeling the silver sheath away from the Ba—Al—Si core. The tapes can then be oxidized by exposing the tapes in a pure oxygen atmosphere in the range of 400° to 500° C. After oxidation is completed, the resulting composite tape consists of a mixture of $Ba_2SiO_4$ and Al.

While certain preferred embodiments of the present invention have been disclosed in detail, it is to be understood that various modifications may be adopted without departing from the spirit of the invention or scope of the following claims.

I claim:
1. A method of making a refractory ceramic body or refractory ceramic composite body of preselected shape comprising:
   a) combining metallic elements, or metallic elements and oxidized metallic elements, of said ceramic to produce a metal-bearing precursor consisting at least in part of an alloy of at least one oxidation-resistant metal disposed to form a ceramic upon oxidation having a molar volume that is greater than the sum of the molar volumes of the metals consumed to make the ceramic and at least one second metal disposed to form a ceramic upon oxidation that has a molar volume that is less than the sum of the molar volumes of the metals consumed to make the ceramic;
   b) forming the metal-bearing precursor into a solid metal-bearing precursor of said preselected shape; and
   c) exposing said solid metal-bearing precursor to an oxidizing environment at a temperature lower than the melting point of said solid metal-bearing precursor to convert said solid metal-bearing precursor into said refractory ceramic body or composite.

2. The method of claim 1 wherein said at least one second metal is at least one metal selected from the group of alkaline earth elements and alkali elements.

3. The method of claim 1 wherein said at least one second metal is at least one metal selected from the group Mg, Ca, Sr, Ba, Ra, H, Li, Na, K, Rb, Cs, and Fr.

4. The method of claim 1 wherein said at least one oxidation-resistant metal is a metal selected from the group of Aluminum, Silicon, and Chromium and metallic alloys that include at least one of the metals from the group of Aluminum, Silicon, and Chromium.

5. The method of claim 4 wherein said alloy contains at least 1 atomic percent of Aluminum, Silicon, or Chromium.

6. The method of claim 1 wherein said at least one second metal is present in said precursor in the amount of at least 5 atomic percent.

7. The method of claim 1 wherein said at least one second metal is present in said precursor within the range of at least 10 to 50 atomic percent.

8. The method of claim 1 wherein said combining consists of mechanical alloying.

9. The method of claim 1 wherein said combining consists of alloying said metals while in a molten or partially molten state to form a molten alloy.

10. The method of claim 9 wherein forming consists of solidification within a mold or preform of a preselected shape.

11. The method of claim 9 wherein step b) is conducted rapidly by melt spinning, planar flow casting, or gas atomization.

12. The method of claim 11 wherein said precursor is a porous ceramic body.

13. The method of claim 1 wherein said combining consists of alloying said elements while vaporized or partially vaporized and forming said precursor by condensation or deposition of the vapor onto a substrate.

14. The method of claim 1 wherein said forming consists of drawing, extrusion, pressing, swaging, or rolling.

15. The method of claim 1 wherein said forming is conducted by solidification of a molten or partially molten precursor.

16. The method of claim 1 wherein said formed precursor is a coating on a substrate.

17. The method of claim 16 wherein said coating is prepared by one or more of co-extrusion, co-rolling, co-drawing, co-swaging, or co-pressing with the substrate.

18. The method of claim 16 wherein said coating is prepared by dipping the substrate into said metal-bearing precursor that is molten or partially molten, and then solidification of the metal-bearing precursor on the substrate.

19. The method of claim 16 wherein said coating is prepared by one or more of laser ablation, sputtering, evaporation, plasma spraying, chemical vapor deposition, molecular beam epitaxy, ion beam mixing, or ion implantation.

20. The method of claim 16 wherein said substrate is a porous body of desired shape which is at least partially internally coated by the said formed precursor.

21. The method of claim 1 wherein said oxidizing environment is at least one oxidizing means selected from the group of a gas containing a vapor-phase oxidant, a solid containing a solid-phase oxidant and a liquid containing a liquid-phase oxidant.

22. The method of claim 21 wherein said oxidants contain at least one of the elements oxygen, nitrogen, sulfur, phosphorus, carbon, hydrogen, chlorine, fluorine, bromine, or iodine.

23. The method of claim 1 wherein said oxidizing environment contains a gradient in electric potential.

24. The method of claim 1 wherein said oxidizing step c) is performed at a substantially isothermal temperature.

25. The method of claim 1 wherein at least one surface of said metal precursor from step a) or step b) is brought into contact with a ceramic surface of a ceramic-bearing component and heated in an inert or vacuum environment prior to step c) to effect complete oxidation of the metal alloy in the oxidizing atmosphere of step c) and bonding between said precursor and ceramic component.

26. The method of claim 25 wherein said at least one second metal is a metal selected from the group of alkaline earth elements and alkali elements.

27. The method of claim 25 wherein said second metal is selected from the group of Mg, Ca, Sr, Ba, Ra, H, Li, Na, K, Rb, Cs, and Fr.

28. The method of claim 25 wherein said ceramic-bearing component contains at least one cation that can be reduced by at least one element in the precursor.

29. The method of claim 25 wherein said ceramic-bearing component is composed of mullite and said at least one second metal is Barium.

30. The method of claim 28 wherein said precursor is a malleable alloy.

31. The method of claim 25 wherein said precursor upon oxidation has a melting point of at least 700° C.

* * * * *

UNITED STATES PATENT AND TRADEMARK OFFICE
CERTIFICATE OF CORRECTION

PATENT NO.  :  5,447,291
DATED       :  Sep. 5, 1995
INVENTOR(S) :  Sandhage

It is certified that error appears in the above-indentified patent and that said Letters Patent is hereby corrected as shown below:

Column 11, lines 45 to 46, the formula should appear as follows:

$$V_m(BaO \cdot SiO_2)/[0.78 \cdot V_m(Ba) + V_m(Si) + 0.22 \cdot V_m(BaO)]$$
$$= 48.51/[0.78 \cdot 39.12 + 12.1 + 0.22 \cdot 26.8] = 1.0$$

Signed and Sealed this

Thirteenth Day of February, 1996

Attest:

BRUCE LEHMAN

*Attesting Officer*   *Commissioner of Patents and Trademarks*